United States Patent Office 2,817,675
Patented Dec. 24, 1957

2,817,675

BASIC CONDENSATION PRODUCTS CONTAINING NITROGEN

Kurt Hofer, Neue Welt, Munchenstein, and Hans Martin Hemmi, Binningen, Switzerland, assignors, by mesne assignments, to Saul & Co., Newark, N. J., as nominee of Fidelity Union Trust Company, executive trustee under Sandoz Trust No Drawing. Application December 4, 1952
Serial No. 324,119

Claims priority, application Switzerland December 7, 1951

3 Claims. (Cl. 260—459)

The present invention relates to basic condensation products containing nitrogen.

More particularly, the invention is concerned with the embodiment of condensation products of the indicated type which, because of the properties imparted thereto by the characteristic structure thereof, as hereinafter set forth, are especially suitable as dyeing auxiliaries, in the dyeing of textiles and the like. While the dyeing auxiliary art is a highly developed one, there is still room for additional products and especially those which, like the products of the present invention, are easily water-soluble and can be used in neutral, acid or alkaline baths.

The nitrogenous condensation products of the present invention are prepared by reacting an ether which corresponds to the formula $$R\text{—}O\text{—}CH_2\text{—}X$$

wherein R stands for any hydrocarbon radical which contains 8–24 carbon atoms and which may be interrupted by one or more hetero atoms, preferably oxygen, and X stands for one of the following moieties:

with a polyamine of the formula

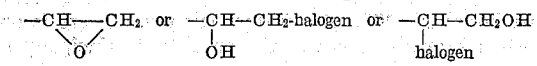

wherein each of $R_1$, $R_2$, $R_3$ and $R_4$ stands for a hydrogen atom, an alkyl or aralkyl or hydroxyalkyl group or a polyglycolether radical, A stands for an alkylene group containing 2 to 4 carbon atoms, and $n$ is a whole number, and wherein, in the event $n$ is one, less than all of $R_1$, $R_2$, $R_3$ and $R_4$ stand for hydrogen atoms.

In appropriate cases, the product obtained as a result of the reaction described in the preceding paragraph may be subjected to the action of an alkylating agent, whereby a quaternary ammonium compound results which, for the indicated purpose (dyeing assistant), is equally as good as the free base, and in some cases may give rise to additional desirable properties (as for example, germicidal activity) due to the presence of the onium radical.

In carrying out the present invention, the following compounds are particularly suitable as starting materials:

(a) Ethers: octyloxypropenoxide, dodecyloxypropenoxide, hexadecyloxypropenoxide, octadecyloxypropenoxide, octadecenyloxypropenoxide, alkylphenoxypropenoxides, compounds of the formula

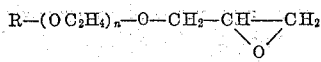

wherein $n$ is a whole number and R is any desired hydrocarbon chain containing 8–24 carbon atoms, and also the halogenhydrins corresponding to the afore-enumerated epoxides.

The halogenhydrins corresponding to the above named epoxides may be prepared from the corresponding alcohols by reacting them by known methods in the presence of acidic catalysts with glycerolepihalogenides such as epichlorhydrin and the above named epoxides by treating the corresponding halogenhydrins also by known methods with alkaline agents which are capable of splitting off halogenohydric acids.

(b) Polyamines: diethylenetriamine, dipropylenetriamine, poly-ethylene- and/or polypropylene-polyamines, methylamino-ethylamine, 3-isopropylamino-propylamine-1, and 3,3-dimethylamino-propylamine-1, etc.

The condensation products obtained from the ethers and amines according to the invention can, if desired and if they contain alkylatable nitrogen atoms, be alkylated or peralkylated (quaternized) by treatment with alkylating agents such for example as ethylene oxide, dimethyl sulfate, diethyl sulfate, chloracetic acid, chloroxypropane-sulfonic acid, benzyl chloride, etc.

The reaction of the aforedescribed components is preferably carried out at elevated temperature, e. g. between 40 and 160° C. The reaction products are oily to viscous liquid products, which are readily soluble in water and which correspond, in the case of the non-alkylated products, to the formula

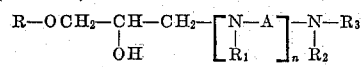

and, in the case of the alkylated products, to the formula

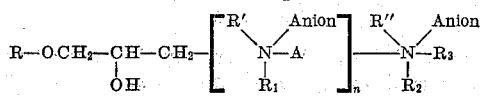

wherein R, $R_1$, $R_2$, $R_3$, $R_4$, A and $n$ have the previously-indicated significances, and wherein R' and R" represent the groups introduced by the alkylation.

As hereinbefore set forth, the products of the invention are primarily intended to be used as dyeing assistants, and in this connection they may be employed as such or in admixture with suitable and conventional additional substances.

The products which may be obtained as described above show excellent levelling, penetrating and stripping action for substantive, acid, basic, chrome and vat dyestuffs, when applied in suitable dissolved or emulsified state.

The following examples illustrate the invention by means of representative exemplary embodiments thereof. In the said examples, the temperatures are expressed in degrees centigrade.

*Example 1*

1 mol of n-octyloxypropenoxide

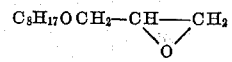

is admixed with 2 mols of diethylenetriamine and the mixture heated to 100–120°, whereupon reaction ensues. Upon completion of the reaction, any unreacted diethylenetriamine which remains in the reaction mixture is distilled off under reduced pressure, and the residue reacted with 8 mols of ethylene oxide at 100° and thereafter with 3 mols of dimethyl sulfate at 50–60°. Upon completion of the reaction, heating is continued for two more hours at 80–85°, whereupon all the dimethyl sulfate will be consumed. There is obtained a brownish, viscous, readily water-soluble mass.

*Example 2*

1 mol of n-dodecyloxypropenoxide

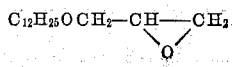

is reacted, after the manner described in Example 1, with 2 mols of diethylenetriamine, and then with 8.5 mols of ethylene oxide and 3 mols of dimethyl sulfate. There is obtained a brownish, jelly-like, readily water-soluble mass.

*Example 3*

1 mol of oleyloxypropenoxide

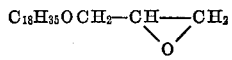

is reacted after the manner described in Example 1, first with 2 mols of diethylenetriamine, then with 8.5 mols of ethylene oxide, and finally with 3 mols of dimethyl sulfate. The resultant product dissolves easily in water. It corresponds to the formula

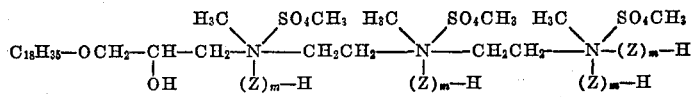

The corresponding non-alkylated product has the formula

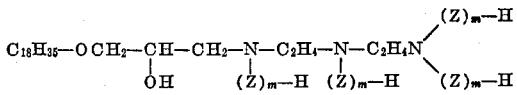

In these formulae, each Z represents an ethenoxy group and each $m$ stands for a positive integer, the total number of Z groups being from 8 to 9.

The nonmethylated product is an excellent levelling agent for acid and the methylated one a good levelling agent for vat dyestuffs.

*Example 4*

1 mol of iso-octylphenoxypropenoxide is reacted, after the manner described in Example 1, at 100–120° with 2 mols of diethylene triamine and, after removal of excess of the latter, ethylene oxide is introduced into the resultant compound of the formula

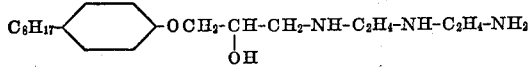

at 100° until 7 mols of ethylene oxide have been taken up. The resultant product is then reacted at 60–80° with 3 mols of dimethyl sulfate. There is thus obtained a brownish, readily water-soluble, jelly-like paste.

*Example 5*

The procedure according to Example 3 is repeated, except that instead of 3 mols of dimethyl sulfate, 1.5 mols of benzyl chloride are used for the alkylation. A product similar to that of Example 3 is obtained.

The unalkylated product is a brownish, viscous, readily water-soluble oil.

*Example 6*

1 mol of the compound

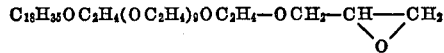

is reacted at 100–120° with 1 mol of diethylenetriamine. The product is a brownish viscous oil which is readily soluble in water.

In lieu of 1 mol of diethylenetriamine, the aforesaid epoxide (1 mol) may also be reacted with any other suitable polyalkylenepolyamine, a similar product being obtained in each case.

*Example 7*

1 mol of oleyloxypropenoxide is stirred for 4 hours with an excess of diethylenetriamine at 100–120°, unreacted diethylenetriamine being thereupon distilled off under reduced pressure. The residue is then added dropwise with stirring at 40–50° to a solution of 4 mols (378 grams) of monochloracetic acid in the like amount by weight (378 grams) of water. Thereupon 4 mols of caustic soda (NaOH) in the form of an aqueous solution of 38% by weight strength are also added dropwise, while stirring thoroughly, at 60–70°. Upon suitable drying, for example in an atomizer, there is obtained a light powder which apart from sodium chloride, contains the compound of the formula

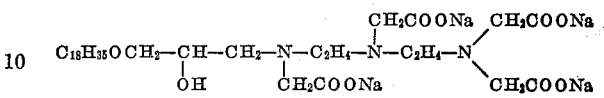

as the principal ingredient.

*Example 8*

1 mol of oleyloxypropenoxide is added dropwise and  with stirring, at 100°, to 2 mols of ethylenediamine hydrate, and the mixture then further stirred at 120° for 4 hours. Excess amine and water are thereupon removed by distillation under reduced pressure, the residue being obtained in the form of a thickly viscous, brownish oil which consists predominantly of the compound of the formula

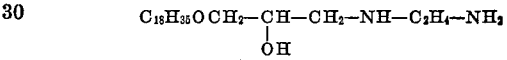

If one mol of this product is reacted with 5 mols of ethylene oxide at 100° C., there is obtained a brownish, viscous oil which is readily soluble in water and which is a good levelling agent for acid dyestuffs.

*Example 9*

To 1 mol of 3-isopropylamino-propylamine-1, there is gradually added, while stirring at 100°, 1 mol of oleyloxypropenoxide, after which the mixture is heated for 4 more hours at 120°, with further stirring. There is obtained a brownish, viscous oil, consisting principally of the compound of the formula

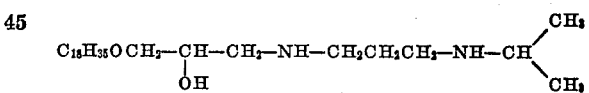

*Example 10*

Ethylene oxide is introduced, with stirring, into 1 mol of the compound prepared according to Example 9, until 2 mols of ethylene oxide are taken up.

*Example 11*

At a temperature of 100°, 1 mol of oleyloxypropenoxide is slowly added to 1 mol of dimethylamino-propylamine-1, after which the mixture is heated to 120–130° for 4 hours. A brownish product is obtained, the major portion of which corresponds to the formula

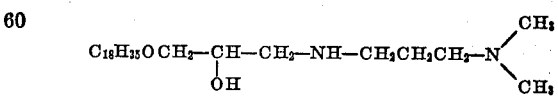

*Example 12*

One mol of n-octadecenyloxypropenoxide is admixed with 1.2 mols of diethylenetriamine and the mixture heated to 100–120° C., whereupon reaction ensues. After completion of the reaction the temperature is lowered to 50° C., whereupon one mol of dimethylsulfate and 1.2 mols of 30% aqueous sodium-hydroxide solution is added and the temperature kept at 50° C. till reaction is complete. The methylated reaction product thus obtained is heated to 120° C. and reacted with 4.2 mols of ethylene oxide. There is obtained a brownish viscous readily water-soluble oil. Used in small concentrations in the acid dye bath it shows an excellent levelling action.

Example 13

One mol of n-octadecenyloxypropenoxide is reacted in a suitable closed vessel at a temperature of 100 to 120°

$$CH_3-CH\begin{matrix}CH_2-CH_2\\ \\ CH_2-CH_2\end{matrix}CH-O-CH_2-CH(OH)-CH_2-NH-C_2H_4-NH-C_2H_4-NH-C_2H_4-NH-C_2H_4-NH_2$$

with 1.2 mols of diethylenetriamine. After completion of the reaction, 7.0 mols of ethyleneoxide are introduced into the resultant compound at a temperature of 120°. The temperature is now lowered to 50° C. and the oxyethylated compound reacted with two mols of epichlorhydrin. The resulting product, which consists of a brownish viscous readily water-soluble mass, shows an excellent levelling action in acid dye baths, even when used in small concentrations.

Example 14

At a temperature of 100–120° one mol of tetraethylenepentamine is reacted with two mols of n-octadecenyloxypropenoxide and after completion of the reaction further reacted at a temperature of 120° C. with a 4.5 mols of ethyleneoxide. The resulting reaction product is a brownish, viscous oil readily soluble in water, which shows a good levelling action in acid dye baths.

Example 15

One mol of n-octadecenyloxypropenoxide is reacted at a temperature of 100–120° C. with 1.2 mols of diethylenetriamine. The resulting product is further reacted at a temperature of 120° with 0.5 mol of ethyleneoxide. After completion of the reaction, the temperature is lowered to 40–50°, whereupon one mol of finely divided sodium hydroxide and one mol of the sodium salt of chloroacetic acid is added. After stirring at 50° for three hours the reaction is complete. The resulting compound is a brownish, sticky paste which is readily soluble in water and which shows, even in small proportions, an excellent levelling action in acid dye baths.

Example 16

One mol of diamylphenoxypropenoxide is first reacted at a temperature of 100–120° with 1.5 mols of diethylenetriamine and then, at the same temperature, with 7 mols of ethyleneoxide. The temperature is now lowered to 50° and the oxyethylated compound reacted at the said temperature with 3 mols of dimethylsulfate. After completion of the reaction there is obtained a brownish, water-soluble, very viscous oil. This compound shows, even in small quantities, a very strong stripping action on vat dyes.

Example 17

At a temperature of 100–120° one mol of n-octadecenyloxypropenoxide is first brought into reaction with 1 mol of 3-dimethylaminopropylamine and then, for five hours, at a temperature of 70–85°, with two mols of glycerolmonochlorhydrin. The resulting compound is a water-soluble, brownish, viscous oil which, even in small quantities, greatly improves the stripping effect of stripping baths for vat dyed cellulosic materials.

Example 18

1 mol of methylcyclohexyloxypropenoxide is reacted for four hours, by stirring, at a temperature of 100–120° with 1.1 mols of tetraethylenepentamine. The resulting product chiefly consists of a compound of the probable formula:

It is a brownish oil, which is readily soluble in water and which, even in small quantities, shows a good levelling action in acid dye baths.

Example 19

One mol of xylenyloxypropenoxide is reacted at a temperature of 100–120° with 1.1 mols of diethylenetriamine, by stirring the two reactants for four hours at said temperature. The resulting compound is a viscous brownish oil, which essential ingredient probably corresponds to the following formula:

$$\begin{matrix}CH_3\\ \\ CH_3\end{matrix}\diagup\!\!\diagdown-O-CH_2-CH(OH)-CH_2-NH-C_2H_4-NH-C_2H_4-NH_2$$

A compound with similar properties may be obtained if a polyamine boiling above 206° at 12 mm. mercury gauge is employed instead of diethylenetriamine.

Such a compound shows, when emulsified with an oleylpolyglycolether containing up to 20 mols of ethyleneoxide per mol oleylalcohol, an excellent levelling action for acid dyestuffs.

Example 20

One mol of the epoxide of the formula $$C_{12}H_{25}S-C_2H_4-O-C_2H_4O-CH_2-CH-\!\!-\!\!CH_2$$
$$\diagdown O \diagup$$

prepared from dodecylmercaptan, two mols of ethyleneoxide and one mol of epichlorhydrin is reacted at a temperature of 100–120° with 1.2 mols of diethylenetriamine by stirring the reactants for four hours at said temperature. The resulting compound is a viscous, brownish oil which is soluble in water and which shows good levelling action for acid dyestuffs.

Having thus disclosed the invention, what is claimed is:

1. A basic, nitrogenous condensation product selected from the group consisting of the products of the formulae $$C_{18}H_{35}-OCH_2-\underset{OH}{CH}-CH_2-\underset{(Z)_m-H}{N}-C_2H_4-\underset{(Z)_m-H}{N}-C_2H_4N\diagup\diagdown\begin{matrix}(Z)_m-H\\ \\ (Z)_m-H\end{matrix}$$

and $$C_{18}H_{35}-OCH_2-\underset{OH}{CH}-CH_2-\underset{(Z)_m-H}{\overset{H_3C\diagup\diagdown SO_4CH_3}{N}}-CH_2CH_2-\underset{(Z)_m-H}{\overset{H_3C\diagup\diagdown SO_4CH_3}{N}}-CH_2CH_2-\underset{(Z)_m-H}{\overset{H_3C\diagup\diagdown SO_4CH_3}{N}}-(Z)_m-H$$

wherein each Z stands for an etheneoxy group and each m stands for a positive integer, the total number of Z groups being from 8 to 9.

2. A basic, nitrogenous condensation product of the formula $$C_{18}H_{35}-OCH_2-\underset{OH}{CH}-CH_2-\underset{(Z)_m-H}{N}-C_2H_4-\underset{(Z)_m-H}{N}-C_2H_4N\diagup\diagdown\begin{matrix}(Z)_m-H\\ \\ (Z)_m-H\end{matrix}$$

wherein each Z stands for an ethenoxy group and each m stands for a positive integer, the total number of Z groups being from 8 to 9.

3. A basic, nitrogenous condensation product of the formula
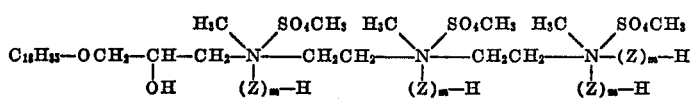
wherein each Z stands for an ethenoxy group and each $m$ stands for a positive integer, the total number of Z groups being from 8 to 9.
References Cited in the file of this patent
UNITED STATES PATENTS
| | | |
|---|---|---|
| 2,334,517 | Tucker | Nov. 16, 1943 |
| 2,523,177 | Yowell et al. | Sept. 19, 1950 |
| 2,527,963 | Rieveschl | Oct. 31, 1950 |